Aug. 7, 1934.     S. M. FINN     1,968,934
FURNACE
Original Filed Dec. 10, 1928   2 Sheets-Sheet 1
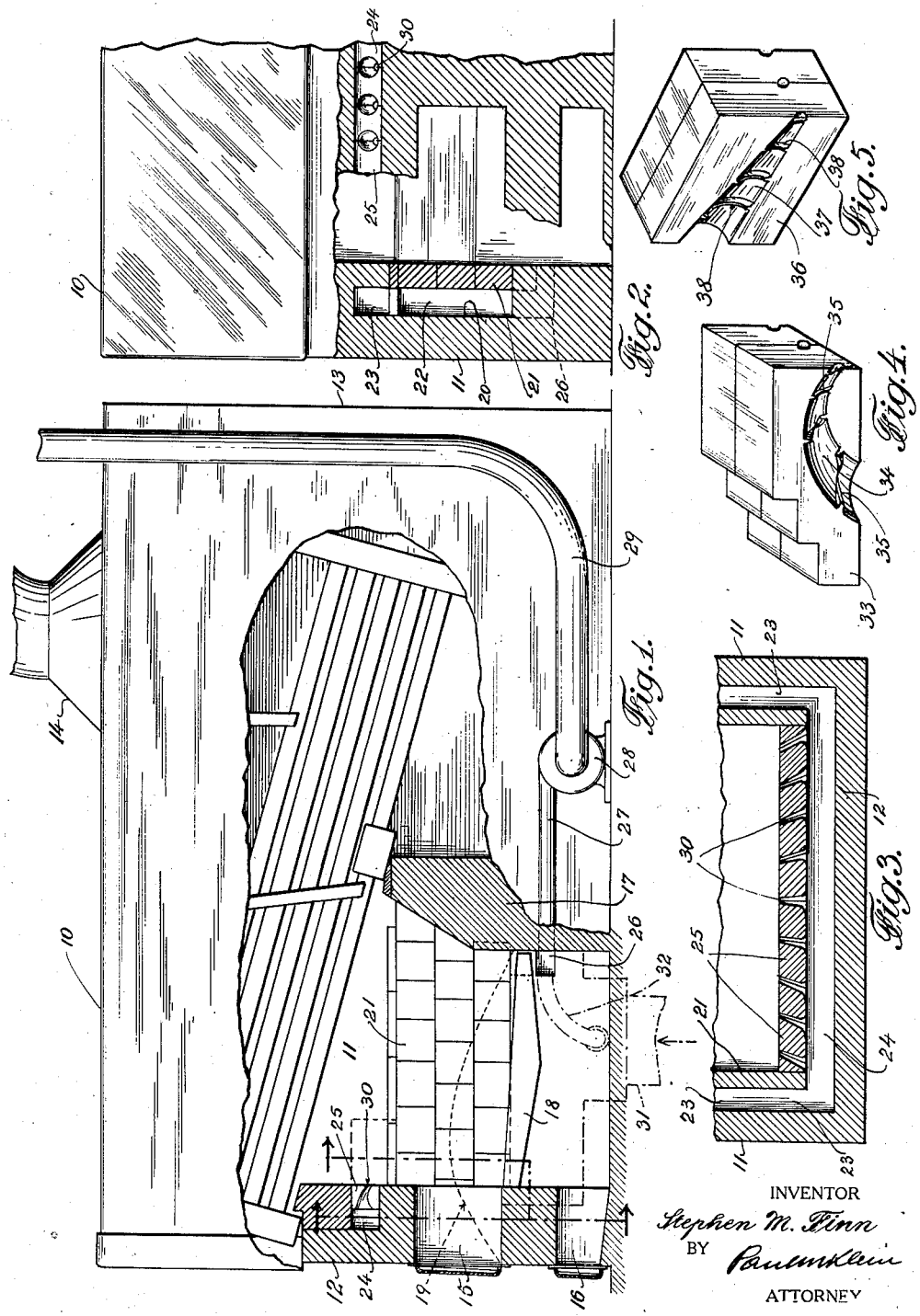
INVENTOR
Stephen M. Finn
BY
ATTORNEY Aug. 7, 1934.  S. M. FINN  1,968,934
FURNACE
Original Filed Dec. 10, 1928  2 Sheets-Sheet 2
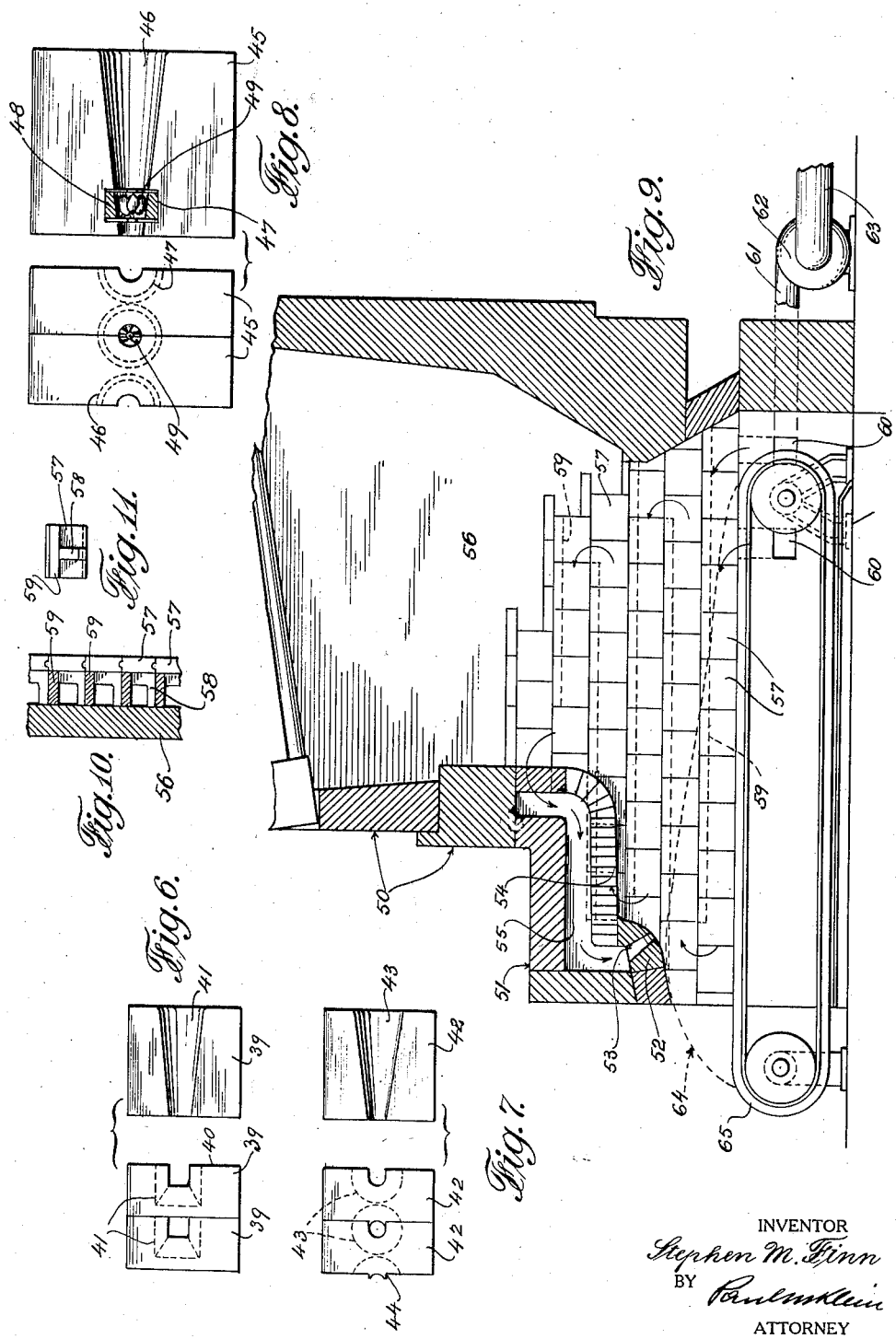
INVENTOR
Stephen M. Finn
BY
ATTORNEY Patented Aug. 7, 1934

1,968,934

UNITED STATES PATENT OFFICE 1,968,934

FURNACE

Stephen M. Finn, Jersey City, N. J., assignor to Drake Non-Clinkering Furnace Block Company, Inc., New York, N. Y.

Application December 10, 1928, Serial No. 325,068
Renewed June 26, 1933

4 Claims. (Cl. 110—75)

This invention relates to furnaces and the like.

One of the prime objects of my invention is a new and effective method of improving combustion in furnaces in general and specifically in producing complete combustion within the confines of a furnace before the combustibles are allowed to pass up the flue.

Another object of my invention is the method of improving combustion within a furnace by eliminating smoke and ashes to be carried up the flue.

Another object of my invention is the method of improving combustion within a furnace by preventing or overcoming stratification of gases arising from the fuel bed of a furnace.

Another object of my invention is the method of improving combustion within a furnace by imparting to the combustible gases emanating from the fuel bed, a turbulent action and a successive movement of the agitated gases along the fuel bed.

Another object of my invention is the method of causing agitation and movement of combustible gases emanating from the fuel bed by the introduction of a substantially nonoxidizing, so to speak, mechanical agent.

A further object of my invention is the method of causing agitation and movement of combustible gases arising from a fuel bed by preheated, rarefied oxygen-poor air under pressure at high velocity.

A further object of my invention is the method of improving combustion within a furnace by subjecting the combustible gases emanating from the fuel bed to a combined turbulent and traveling motion, thereby causing them to travel from the coking zone of the fuel bed, which is deficient in oxygen, to other parts of the fuel bed having an excess of oxygen, thereby balancing the oxidation process and preventing the formation of an excess of oxygen in the flue gases.

Another object of my invention is the method of introducing into a furnace above the fuel bed and into the region of formation of oxygen-poor combustible gases emanating from the fuel bed, a substantially non-oxidizing medium of high temperature under pressure and at high velocity.

Another object of my invention is the provision within a furnace of preheaters for gaseous media to be introduced into the furnace above the fuel bed.

Another object of my invention is to provide in connection with a furnace and preheaters for gaseous media integral with said furnace, means for forcibly supplying such media into said preheaters.

Another object of my invention is the provision in combination with a furnace, of preheaters for gaseous media, means for supplying such media to the preheaters under pressure, and means for discharging the preheated media under pressure and at high velocity above the fuel bed of a furnace.

A further object of my invention is to provide ejectors or nozzles adapted to be associated with a furnace, and placed above the fuel bed for discharging substantially non-oxidizing media under pressure at high velocity, and into the gases emanating from the fuel bed.

Another object of my invention is to provide such nozzles with means for imparting to the media ejected by them, a rotary or twisting momentum.

Another object of my invention is to provide refractory blocks having at their abutting faces, tapering channels so arranged, that when the faces of two blocks abut, those channels will register and form a substantially conical nozzle.

Another object of my invention is to provide refractory blocks, the abutting faces of which having fluted or ribbed tapering channels, adapted to form nozzles when two blocks are placed together, the fluting or ribbing in said channels adapted to impart to a medium passed therethrough under pressure, a rotary or twisting momentum.

A further object of my invention is to provide refractory blocks forming ejector nozzles and so arranged that the face of one block constitutes one wall of the nozzle cavity formed in the adjacent block.

A still further object of my invention is to provide within the nozzles formed by two adjacent blocks a fan or blade arrangement, preferably stationary, for imparting a twisting or rotary motion to the medium forced through the nozzle, which in turn causes a highly turbulent agitation of the combustible gases arising from the fuel bed.

The foregoing objects in a measure define some of the basic ideas of my invention, however, it might be advantageous to disclose the progressive development of furnace construction in order that my invention shall be more readily understood.

It is well known that so-called over fire air, or more definitely defined, air introduced in the combustion chamber between the solid fuel bed and the heat absorbing surfaces, is in common use.

There are two methods employed in this construction, firstly, in supplying the air by induction in which the suction of the furnace induces air thereinto at relatively low velocity and usually, although not necessarily, forms a relatively high percentage of the total air required for combustion.

In the second method, air is supplied from air ducts or a plenum chamber with a relatively small pressure differential between the air duct or plenum chamber and the furnace. In this method usually, although not necessarily, a relatively small percentage of the total air required for combustion is introduced.

By both aforesaid methods, what is known as stratification of gases arising from the fuel bed, is highly accentuated, in other words, the gases arising from the fuel bed often will slowly rise above the fuel bed without being capable of being oxidized, due to the fact that through a deep fuel bed very little oxygen will penetrate. Unless mechanical means are employed for mixing such gases with air, proper combustion is not obtained.

The employment of arches, restricted throats or baffles are considered means for intermixing the combustibles of low oxygen content with air passing through the grates at places where the fuel bed is thin. By the employment of such devices, smokelessness is usually the result of dilution. The degree of efficiency of combustion, reflected by the $CO_2$ content, is in such construction usually very low.

In order to overcome the deficiency in oxygen of the volatile combustible gases arising from the coking zone of the furnace, the so-called over fire air was introduced, whereby air is passed into the furnace through and above the fuel bed. It was thought that by this method the deficiency of the gases in the coking zone, and the excess of air of other zones of the fuel bed, will be balanced. The result, however, showed that such method induced excessive air and became a detrimental to efficient combustion.

Efficient combustion is based on the principle of intimately mixing combustibles with oxygen without an excess of oxygen. This principle is particularly expressed in pulverized fuel burners and atomizing oil burners in which a complete oxidation of fuel in relatively small volume takes place due to the turbulent action to which the fuel and air is subjected. Such complete combustion is accomplished in a relatively small volume, and therefore permits the use of small furnace volume. Consequently, complete combustion, caused by turbulent action, is tantamount to an increased furnace volume.

It is an established fact that turbulent burning of fuel in suspension can be accomplished with a small percentage of excess oxygen and with a very high percentage of $CO_2$.

The rich, volatile gases emanating from the hot fuel bed from certain of its zones are combustibles or fuel in suspension.

By subjecting such fuel in suspension to a turbulent action, a complete combustion will ensue with a relatively small percentage of excess air in a comparatively small furnace space without smoke and with a relatively high $CO_2$ content.

My invention will be more clearly understood by the following description and the accompanying drawings, forming part of my disclosure, but by no means intended to restrict my invention to the specific structure shown, it being understood that various modifications may be made without departing from the principle of my invention as set forth in the appended claims.

In said drawings, Figure 1 illustrates a side elevation partially in section, of a conventional boiler setting.

Figure 2 is a partial front elevation, certain sections of which being broken off, as indicated by section lines, shown in Figure 1, Figure 3 is a typical horizontal cross sectional view through the front portion of a furnace equipped with my improvements, Figure 4 is a perspective view of refractory blocks forming nozzles, Figure 5 is a perspective view of refractory blocks, showing modified forms of nozzles.

Figures 6 and 7 illustrate other modifications of nozzle-forming blocks,

Figure 8 illustrates a still different type of nozzle blocks in which a fan is provided.

Figure 9 is a vertical, longitudinal cross sectional view through a furnace, having movable grates, and in which my invention is incorporated, Figure 10 is a partial transverse cross sectional view through the side wall and lining of a furnace, showing baffle layers for directing the flow of a gaseous agent under pressure, and Figure 11 illustrates a preferred construction of a lining brick provided with a spacer adapted to support a baffle brick.

Referring to the Figures 1, 2 and 3, numeral 10 denotes the outer body of a furnace provided with outer side walls 11, front wall 12 and rear wall 13. Extending above the furnace there is shown an up-take 14, from which the spent fuel gases are delivered to the stack. The front wall 12 is shown to be provided with a conventional firing opening 15 and ash pit opening 16.

Extending from the lower surface of the firing door opening towards the bridge wall 17, there is shown a grate 18, over which, as indicated in dotted lines, is the outline of the fuel bed 19. The side walls 11 are offset at 20, so as to provide a foundation for an auxiliary inner side wall 21, formed by a series of bricks spaced from the reduced outer wall 11, as indicated at 22 in Figure 2. Duct 22, formed between the outer wall 11 and the inner wall 21, terminates at its upper end into a side passage 23, which issues into a front passage 24 above the firing opening.

Facing passage 24 from within, is a series of refractory blocks 25, shown in detail in Figures 4 and 5. Ducts 22, which are symmetrically arranged at both side walls of the furnace, are equipped with an inlet 26, shown clearly in Figure 1.

Connected with inlet 26, shown in Figure 1 in full lines, is a duct 27, extending from a blower 28, which is connected by duct 29 to the flue leading to the stack. The flue gases are thus conveyed to passages 22 under pressure, where these gases are preheated before they reach passage 24, from where the gases issue through nozzles 30, provided in blocks 25.

An alternative is illustrated in dotted lines below the grates where an air supply duct 31 is shown, through which air is supplied under pressure to the fuel bed. An auxiliary outlet pipe 32 is shown to be leading to inlet 26, whereby air is delivered to the ducts 22 of the preheaters. In this case the air is rarefied and its oxygen content considerably reduced before it is supplied through passage 24 to nozzles 30.

Referring to Figures 4 and 5, numeral 33 denotes one of the many forms of a refractory block provided with a curved, tapering channel 34, the inner surface of which is equipped with ribs 35. When two of the blocks abut with each other, their tapering channels will register and their ribs will complete a spiral passage through which a gaseous medium is forced to pass. Thus, a twisting or revolving momentum will be imparted thereto.

A modified form of the blocks is shown in Figure 5. In this figure, blocks 36 are provided with tapering channels 37, at their surfaces of which are shown ribs or flutes 38. When two blocks are set with their channeled faces against each other, they will form a tapering, fluted or ribbed nozzle.

In Figures 6 and 7 there are shown modified forms of nozzles. In this case, for simplicity sake, these nozzles are of a straight pattern. The blocks are shaped somewhat differently from those shown in Figures 4 and 5, in that practically the entire nozzle formation is moulded within the entire block body so that the straight face, or practically straight face, of the adjacent block forms the end wall of the nozzle.

This will be particularly evident in Figure 6 where blocks 39 are shown. Their right hand abutting faces 40 are interrupted by the formation of the nozzle cavity, indicated at 41. In this case the shape of the nozzle is of substantially square cross section.

In Figure 7 the nozzle formation is very similar to that explained in connection with Figure 6. However, the nozzle cavity in this case is conical. Blocks 42 are provided at their right half with a larger portion of the nozzle cavities 43, while their left hand side is provided with the smaller portion of the nozzle cavities. At the faces, and particularly at the very end of the nozzle orifice, there is an extension marked 44, which completes the discharge end of the nozzles.

Figure 8 illustrates nozzle blocks somewhat similar to that shown in Figure 5. In this case blocks 45 are provided with symmetrical nozzle cavities 46. However, at the issue end of the nozzle cavity there is provided a cylindrical recess 47, adapted to house a frame 48 supporting veins, blades or the equivalent of a fan, indicated at 49. The latter is intended to impart to the mechanical agent, pass through the nozzle into the furnace under pressure and at high velocity, a twisting rotary motion, which in turn, causes a violent turbulent action of the fuel bed gases against which the agent is directed.

In order to avoid any misunderstandings as to the application of my method and construction to various furnaces, I have shown in Figure 9 a representative illustration of a furnace equipped with moving grate surfaces and with an arch formed over the coking zone. In this figure, numeral 50 denotes the front wall of the furnace which forms an extension 51. Within this extension there will be seen an arch 52 provided with a nozzle 53. The longer arch reaching over the coking zone and marked 54 is spaced from the outer covering by a channel 55. It will be observed that the side wall 56 is of the usual construction, while a lining is provided about the fuel bed.

This lining is air spaced from the outer side wall, as can be clearly seen in Figure 10, in which lining bricks 57 are illustrated provided with spacers 58. These spacers are so arranged as to provide a support for baffle bricks 59. These baffle bricks are indicated in Figure 9 by dotted lines.

In the ash pit there will be seen inlets 60, adapted to be connected by means of a duct 61 with blower 62, which delivers through duct 63 either air or flue gases into the space between the lining of the furnace and the outer wall. A number of arrows show the direction through which the air or these flue gases travel under pressure along the wall until they finally issue into the channel 55 above the longer arch 54.

Not only do I achieve by this construction the very beneficial cooling of the lining, but I simultaneously accomplish the cooling of the arch, which I consider of great importance.

The agent which is rarefied and therefore made poor in oxygen reaches nozzle 53 through which it is forced at comparatively small volume, but at high velocity. Through employment of any one of the nozzles shown in the drawings, and particularly that seen in Figure 8, a rotary motion is imparted to the agent, which in turn, imparts a highly turbulent action to the fuel gases arising from the fuel bed, which latter is indicated in broken lines at 64.

The construction of a movable grate surface, diagrammatically illustrated at 65, is well known and need not be further explained. Be it understood however, that I shall not be restricted to a moving grate of this construction, and that any kind of moving fuel bed may be incorporated.

Operation

Normally, the products of combustion are carried across or past the heat absorbing equipment of the furnace, in this case represented by the tubes shown above the grates, and extending in an inclined fashion toward the rear of the furnace. The gases are forced to first ascend from the fuel bed and are directed to pass first one baffle plate, then under another baffle plate, and subsequently out towards the stack. No matter in which manner draft is created for taking up the gases to the stack, the gases emanating from the fuel bed form strata rising upwards without changing their relative position to the fuel bed.

In my method I forcibly supply an inert or, so to speak, mechanical agent, of non-oxidizing qualities into the fuel gases arising from the coking zone of the fuel bed, which coking zone is located within a short distance from the firing door, where the fuel is piled up to a considerable height, as shown by broken lines in Figure 1. The fuel bed diminishes in depth toward the rear, and at that zone air passes more readily through the fuel bed, and at that point causes an excess of oxygen supply.

The employment of baffle means is necessary to mix the rich combustible gases lacking oxygen and emanating from the coking zone with the excess of air passing through the rear zone of the fuel bed.

In my method, the agent forced into the gases emanating from the coking zone, will cause these gases to assume a turbulent action and travel successively towards the rear, where they will readily mix with the excess oxygen. In this manner a complete combustion of all gases takes place above the fuel bed, which bears out my contention that a relatively small space is required within which complete combustion may be accomplished through imparting a turbulent and traveling action to the fuel gases.

I am depending no longer upon the mixing of fuel gases and oxygen through the medium of baffle plates. The agent employed to induce turbulent action of the fuel gas is required of having certain important properties. Firstly, it is essential that such agent shall not add oxygen to the firing zones, thereby reducing the possibility of excess oxygen. Secondly, it is required that such agent be introduced at high temperature, under pressure and at a considerable velocity, although at a comparatively small volume, and thirdly, it has to promote such turbulent action which will cause the throwing of fly ash out of suspension along the fuel bed.

For this purpose I have employed refuse gases escaping from the stack by conveying them through duct 29 to blower 28, and from the blower through duct 27 into the preheaters, and through duct 24 to nozzles 30. Such flue gases are nonoxidizing, as they contain very little free oxygen, with the exception of such CO which may be present and which is eliminated when the gases come in contact with the combustible gases in the furnace. The method of preheating the gases in the way described, has two marked advantages. Firstly, it increases the temperature of the agent introduced into the furnace, and it also increases the volume of the agent to a marked extent. Secondly, through the passage of the comparatively cool agent, the lining wall 21 is chilled, thereby a cooling of the furnace lining is accomplished. Through the increase of volume of the agent, its oxygen contents is greatly reduced.

Referring to Figure 9, the delivery of flue gases or air, by means of blower 62, takes place in a similar way as described in connection with Figure 1. However, the provision of baffle bricks 59 lengthens the way of travel of the gases, as indicated by arrows, and considerably increases their temperature and consequently decreases their oxygen content. Furthermore, I achieve another advantage in this construction through the cooling effect of the arch located above the coking zone of the fuel bed.

For the sake of proving to myself that my contention of introducing a turbulent and traveling action to the combustible gases arising from the fuel bed will promote complete combustion, I have employed many kinds of inert gases for this purpose. It is evident, however, that neither flue gases nor other inert gases are readily adaptable for introduction in the furnace because of the expense involved, and I therefore may employ, and have employed, air in connection with my process.

Due to the fact that the air employed in my method is considerably heated before reaching the ejectors, its volume is greatly increased, whereby its oxygen content is proportionately decreased.

Air heated at 500° F. is approximately twice the volume, per given weight, of air of 70° F. Consequently, as the action of my system depends on the mechanical, and hence, volumetric elements of the agent, I consider that pre-heated air will serve my purpose equally well.

It is immaterial whether such air is delivered under relatively high pressure, through the employment of a fan, for the express purpose of forcing air through the pre-heaters, or whether the air directed through the pre-heaters is drawn from the air supply of a forced draft underfed stoker; the result will be the same.

Furthermore, it is immaterial whether the pre-heaters are arranged in the side walls of the furnace or whether they are placed in any other part of the furnace, as long as they are exposed to sufficient heat emanating from the fuel bed to raise the temperature of the forced-through medium to the required height.

In the drawings it is shown that the air is conducted from the pre-heaters into an intercostal air duct built in the front wall of the furnace. Be it understood, however, that such air duct may be readily built externally to the front wall. Furthermore, be it understood that pre-heaters may be arranged in different places than shown in the drawings, depending upon the type of furnace contemplated. Thus, such pre-heaters may be arranged in the front wall, above the grates, or elsewhere where such pre-heaters will be exposed to the influence of heat from the fuel bed.

One of the outstanding differences between the present method and heretofore used applications of air, either through the fuel bed or above the latter, is that such air added through or above the fuel bed results in combusting fuel gases arising from the fuel of the coking zone.

Taking into consideration the illustration shown in Figure 9, and assuming that through nozzle 53 air is added to the gases arising from the fuel bed, combustion would take place right under the longer arch marked 54. The consequence would be that the arch becomes heated without producing any beneficial effect as far as heating the tubes is concerned.

What is foremost in the mind of the constructor of a furnace is to concentrate all the heat against the heat absorbing equipment of the furnace. This is best done through causing the combustion of the fuel directly below such heat absorbing surfaces and not in the spaces in the furnace where direct heat will be ineffective. Through my method I compel the fuel gases emanating from the coking zone of the fuel bed to travel towards the zones of the fuel beds rich in oxygen and located below the heat absorbing equipment of the furnace and permit the oxygen, which ordinarily would be considered excess air passing through the grates, to intimately mix with the rich fuels conveyed from the coking zone into the rich oxygen zone by the mechanical or non-oxidizing agent issuing from nozzle 53.

The drawings illustrate specific designs of construction. Be it understood however, that I shall not be restricted by either the showing, nor by the description in connection with the showing, and I therefore reserve for myself the right to make such changes, improvements, alterations, etc., as may be required to successfully promote the basic idea of my method in connection with furnaces of any design.

I claim:—

1. Discharge means for introducing gaseous agents into a furnace, comprising refractory blocks having at their abutting faces tapering, spirally fluted channels so arranged that the channels of two abutting blocks form a spirally fluted nozzle.

2. Discharge means for introducing gaseous agents into a furnace comprising complementary refractory blocks having at their abutting faces complementary portions of a tapering channel commencing at the under faces of the blocks and curving upwardly and laterally in a horizontal or downward inclined direction at the rear faces of the blocks.

3. Discharge means for introducing air into a furnace comprising complementary refractory blocks having at their abutting faces complementary tapered recesses combining to form a tapered discharge nozzle with means therein for whirling the air delivered through the nozzle.

4. Discharge means for introducing air into a furnace comprising complementary refractory blocks having at their abutting faces complementary recesses combining to form a discharge nozzle, the recesses near their discharge ends formed with complementary enlarged cavities, and a metallic structure enclosed in such enlarged cavities comprising fan blades arranged to give a twisting motion to the air.

STEPHEN M. FINN.